United States Patent [19]

Sakamoto et al.

[11] Patent Number: 5,329,289
[45] Date of Patent: Jul. 12, 1994

[54] DATA PROCESSOR WITH ROTATABLE DISPLAY

[75] Inventors: Kohichiro Sakamoto, Sakai; Yoshiyuki Murashima, Yamatotakada; Hiroshi Nishida, Tenri; Yukihiro Shibata, Souraku, all of Japan

[73] Assignee: Sharp Kabushiki Kaisha, Osaka, Japan

[21] Appl. No.: 874,980

[22] Filed: Apr. 22, 1992

[30] Foreign Application Priority Data

Apr. 26, 1991 [JP] Japan .................................. 3-097458
Apr. 26, 1991 [JP] Japan .................................. 3-097466

[51] Int. Cl.⁵ ........................ G09G 5/00; G09G 5/32; G09G 5/38
[52] U.S. Cl. .................................. 345/126; D14/113; 248/922
[58] Field of Search ............... 340/720, 727; 345/126, 345/905; 248/920, 922, 923, 917, 919, 921; D14/106, 113

[56] References Cited

U.S. PATENT DOCUMENTS

| D. 321,179 | 10/1991 | Oyama | D14/113 |
| D. 343,168 | 1/1994 | Morisaki et al. | D14/106 |
| 4,267,555 | 5/1981 | Boyd et al. | 340/748 |
| 4,542,377 | 9/1985 | Hagen et al. | 340/727 |
| 4,831,368 | 5/1989 | Masimo et al. | 340/727 |
| 5,034,733 | 7/1991 | Okazawa et al. | 345/126 |
| 5,134,390 | 7/1992 | Kishimoto et al. | 345/126 |

FOREIGN PATENT DOCUMENTS

| 0351817 | 1/1990 | European Pat. Off. | 340/727 |
| 59-62891 | 4/1984 | Japan . | |
| 62-173509 | 7/1987 | Japan . | |
| 91/00586 | 1/1991 | PCT Int'l Appl. | 340/727 |

OTHER PUBLICATIONS

IBM Technical Disclosure Bulletin vol. 24 No. 1 A Jun. 1981 pp. 186 and 187.

Primary Examiner—Jeffery Brier
Attorney, Agent, or Firm—Nixon & Vanderhye

[57] ABSTRACT

A data processor with rotatable display includes a display unit having a rectangular display surface rotatable to either a vertically elongated position or a laterally elongated position, and a control unit for setting an onscreen display format presented by the display unit to either a vertically elongated format or a laterally elongated format. The control unit stores the onscreen display format displayed at the time the data processor is turned off. Then when the data processor is later turned on, the stored onscreen display format is used.

5 Claims, 17 Drawing Sheets

DATA PROCESSOR WITH ROTATABLE DISPLAY

BACKGROUND OF THE INVENTION

The present invention relates to a data processor which is incorporated in a word processor, a calculating machine, etc.

In general, a conventional data processor incorporated in a word processor, a calculating machine, and the like includes a display apparatus consisting of a CRT (Cathode-Ray Tube), a main controller for controlling image data which includes characters, figures ad the like displayed on the display apparatus, and a key board which is operated by the user to input the image data. The display apparatus has a display unit which is rectangular in shape the orientation of which is fixed, that is, in either a vertically elongated direction or a laterally elongated.

Having the display unit orientation fixed in either a vertically elongated or a laterally elongated direction creates a number of, problems.

For example, if display unit is fixed in the laterally elongate direction so as to have a laterally elongated screen, a larger number of characters can be displayed in the lateral direction documents of A4 size generated in the lateral elongation are present as a whole A4 page of data at one time.

However, various other layouts and sizes of documents exist, such as A4, B4 and the like with two directions for each document that is, a laterally elongated direction and a vertically elongated direction. In making a document for example, of size A4 and vertically elongated orientation the total number of lines of a page which can be displayed by the display unit is not sufficiently large to display the whole A4 page of data on the screen. This leads inefficient document creation.

In recent years, there has been proposed a data processor including a display apparatus where the display unit can be pivoted to either a vertically elongated position and a laterally elongated position. In such a data processor, however, the user must use the key board to set an onscreen format in a vertically or laterally elongated direction, and such an operation of setting a onscreen format is an annoying task to the user.

As related art to the present invention, for example, U.S. Pat. No. 4,267,555 discloses a rotatable raster scan display which includes a CRT display apparatus which can switch a onscreen display between a vertically elongated layout and a laterally elongated layout. The rotation of the CRT display apparatus is turned on or off by a control switch to selectively control a length of horizontal scanning lines and a length of a sweep corresponding to the direction of the CRT display apparatus. U.S. Pat. No. 4,542,377 also discloses a rotatable display work station which includes a CRT display apparatus which can switch a onscreen display between a vertically elongated layout and a laterally elongated layout and in which two kinds of character generators are provided. Character display begins with characters at the upper left portion of a CRT screen in a lateral (horizontal) mode.

Additionally, there are several similar apparatus disclosed in Japanese Unexamined Patent Publications SHO/59-62891 and SHO/62-173509. The former is an apparatus having a picture display which is rectangular in shape and which can be displaced from a vertically elongated position to a laterally elongated position, and vice versa. Either the vertically elongated position or the laterally elongated position of the picture display is detected, and accordingly, the picture display presents a vertically or laterally elongated picture. The latter publication discloses an apparatus having a display unit and a rotary mechanism for turning the display unit itself, in which turning of the display unit is detected to produce a detection signal, and the contents stored in an image memory is turned and rewritten in accordance with the detection signal. However, the contents remain in their current display position if the turning brings about a disallowable display.

SUMMARY OF THE INVENTION

The present invention provides a data processor with a rotatable display comprising display means which has a rectangular display surface and which can be turned either a vertically elongated position or a laterally elongated position, and control means for setting an onscreen display presented by the display means to either a vertically elongated format or a laterally elongated format under its control. The control means stores an onscreen display which is being presented when the data processor is turned off. That onscreen display stored is presented by the display means when the data processor is turned on again.

In the above structure, preferably, the display means further provides detecting means for detecting a vertically or laterally elongated position of the display means. The control means controls the display means to display either a vertically elongated onscreen layout or a laterally elongated onscreen layout in accordance with a detected result by the detecting means.

In the above structure, preferably, the data processor further comprises switch means for outputting a change command to change a display region which can display data on the display surface into a vertically elongated onscreen layout or a laterally elongated onscreen layout, the display means includes detecting means for detecting a vertically or laterally elongated position of the display means. The control means changes the display region into the vertically or the laterally elongated onscreen layout in accordance with the change command. The control means also includes identification means for comparing a detected result by the detecting means with the change command and for changing the direction of the display region only when a direction of the display means is the same as the direction of the display region designated in accordance with the change command.

In another aspect of the present invention, the present invention provides a data processor with a rotatable display comprising display means which has a rectangular display surface and which can be turned to either a vertically elongated position or a laterally elongated position, and control means for setting an onscreen display presented by the display means to either a vertically elongated format or a laterally elongated format under its control. The display means includes detecting means for detecting a vertically or laterally elongated position of the display means. The control means controls the display means to display either a vertically elongated onscreen layout or a laterally elongated onscreen layout in accordance with a detected result by the detecting means.

DESCRIPTION OF THE PREFERRED EMBODIMENT

As a detecting unit incorporated in the present invention for detecting vertical and lateral display unit directions, various position sensors well-known in the art can be utilized. A good example of such a sensor is one with simple configuration, where a micro-push-switch is provided at a part of the bottom of a display unit, so that it can be recognized that a side of the display coming in contact with a bottom support surface is a "bottom side".

The present invention will now be described in detail based upon embodiment 1, 2 and 3 which are shown in the accompanying drawings.

With reference to FIGS. 1 to 11, an embodiment 1 of the present invention will be described below.

Figure 1:
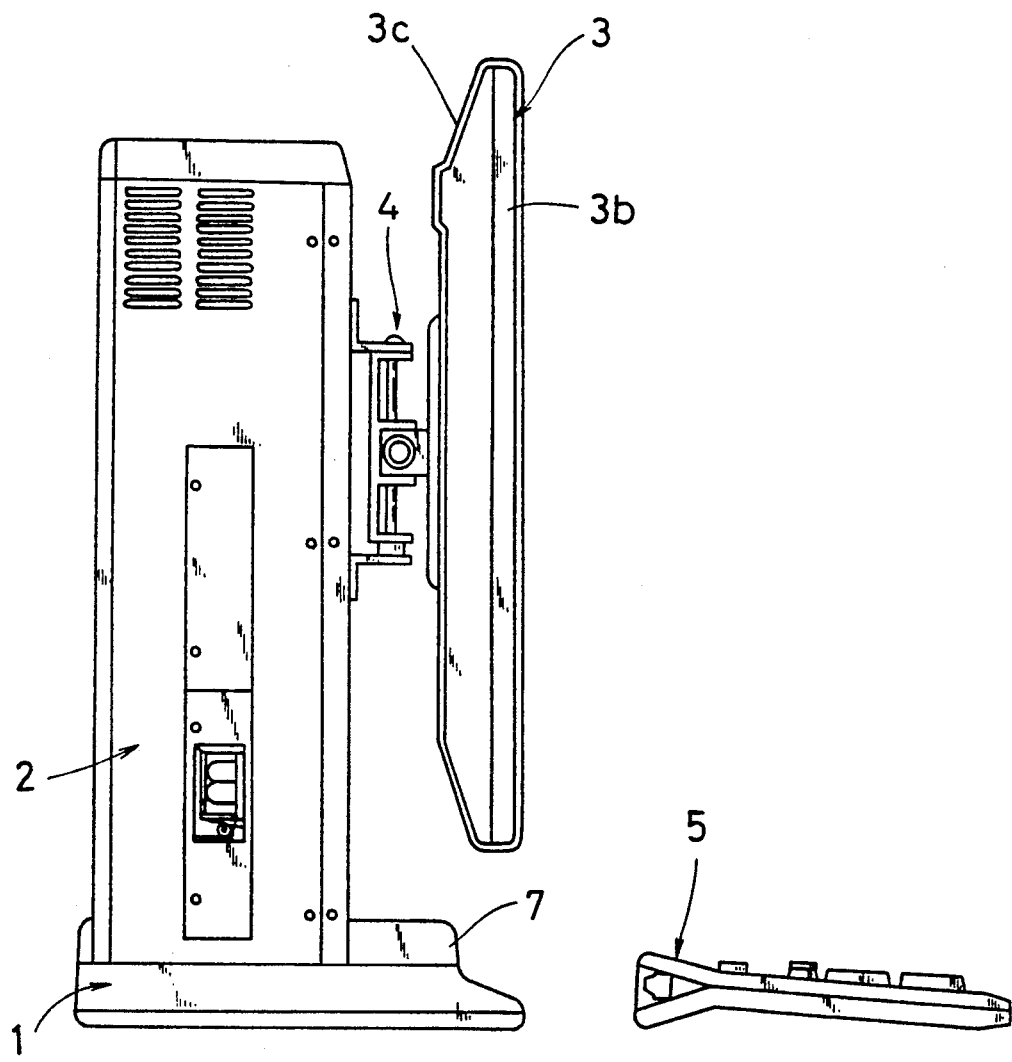
FIG. 1 is a side view showing an embodiment 1 of a data processor according to the present invention.
Figure 2:
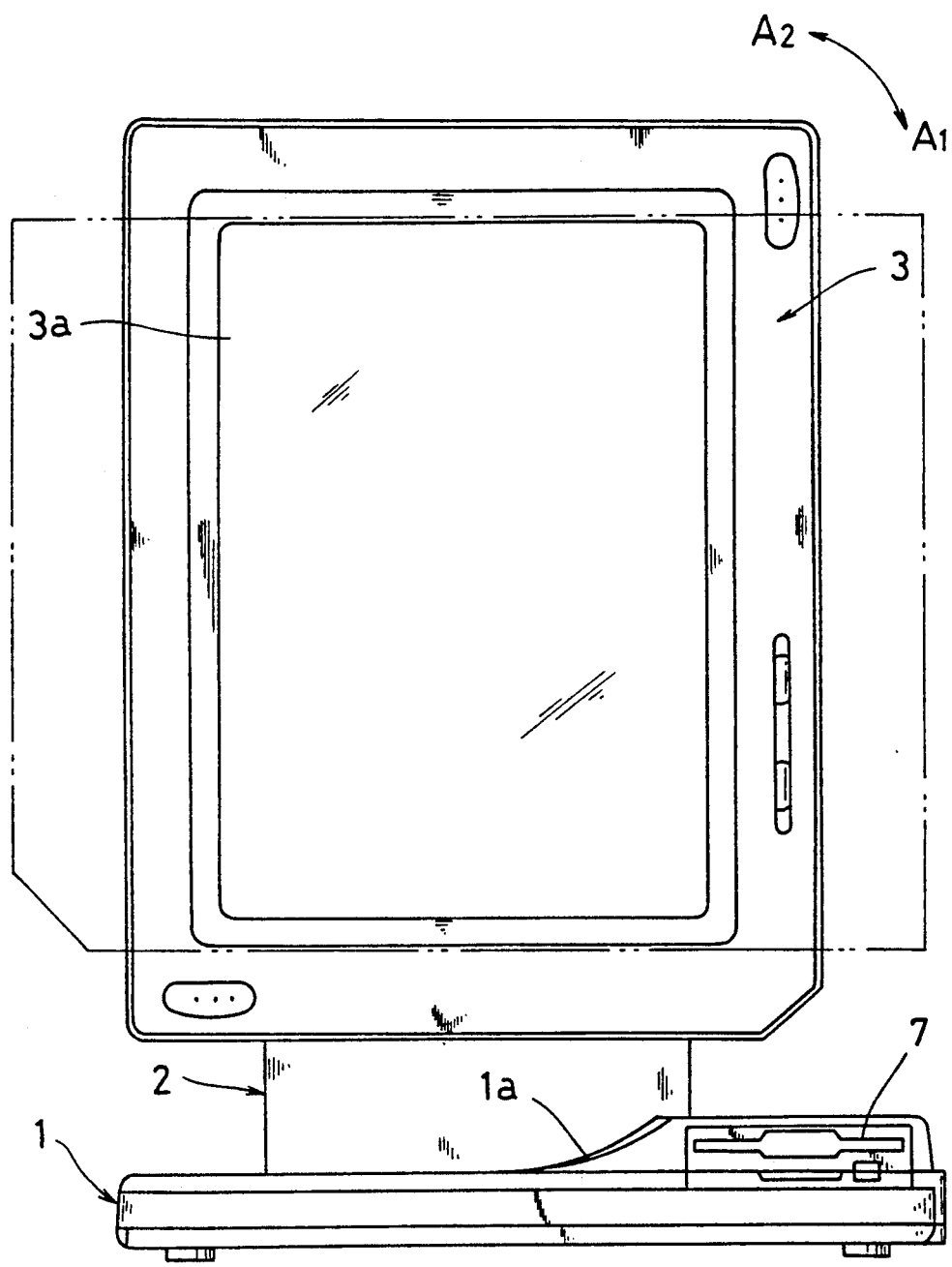
FIG. 2 is an elevational view showing the data processor comprised of a base, a post, and a display unit.
Figure 3:
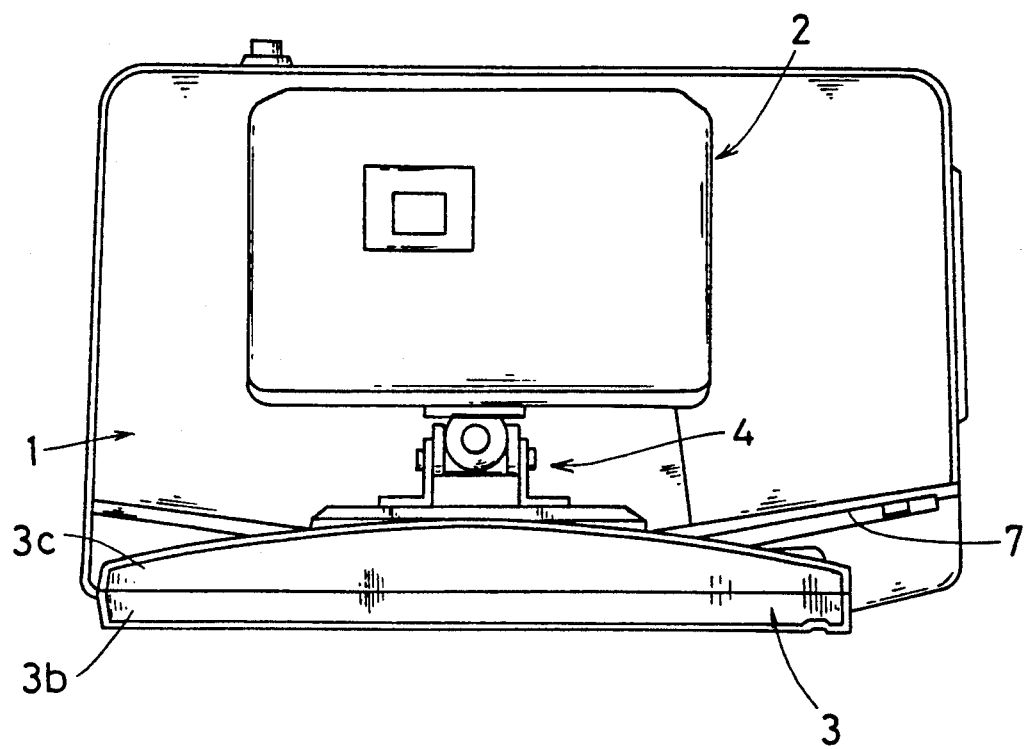
FIG. 3 is a plan view showing the base, pier and display unit.

As shown in FIGS. 1 to 3, a data processor of the embodiment 1 includes a base 1 rests on a desk or the like, a post 2 fixed upright on the base 1, a display unit 3 which is rotatably attached on a front side of the post 2 facing to the operator that it can turn in an $A_1$-$A_2$ direction, a fixing element 4 by which the display unit 3 is so fixed to the post 4 that it can rotate, and a key board 5 with which the operator inputs picture data such as characters, figures, etc..

Figure 4:
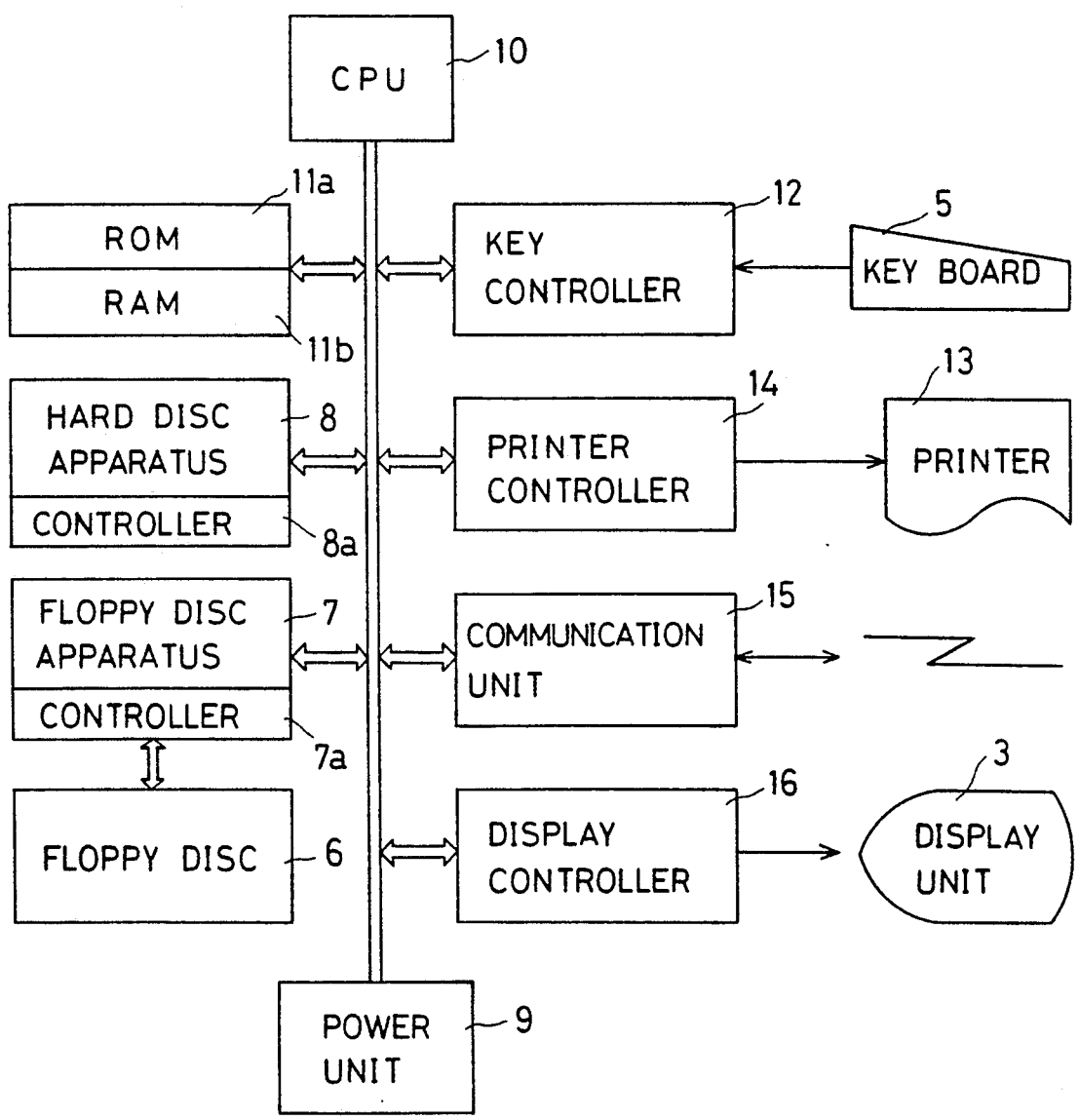
FIG. 4 is a block diagram showing a control unit in the data processor.

A floppy disc apparatus 7 is mounted at a part of the front of the base 1, which performs, as shown in FIG. 4, recording/reproducing of picture data in floppy discs 6 under the control of a controller 7a of a control unit mentioned later. The floppy disc apparatus 7 has its opposite sides formed in curved surface 1a in order to prevent any physical interference between the display unit 3 and the base 1.

As shown in FIG. 4, the post 2 houses the control unit consisting of a CPU (Central Processing unit) 10, a ROM (Read Only Memory) 11a which stores programs including, for example, a onscreen layout setting routine for setting a vertically elongated or laterally elongated onscreen format, a RAM (Random Access Memory) 11b which includes a scroll start position storing region, a picture data storing region, a display data storing region, etc., a key controller 12 connected to a key board 5, a printer controller 14 connected to a printer 13, a communication unit 15 which enables a communication with other data processors and the like, and a display controller 16 connected to the display unit 3, and its also includes a hard disc apparatus 8 which can record/reproduce picture data through a controller 8a similar to the above-mentioned floppy disc apparatus 7, and a power source unit 9 for supplying power to the control unit, hard disc apparatus 8 and the like.

The display unit 3 has a rectangular liquid crystal display panel 3a. The liquid crystal display panel 3a includes a first panel frame 3b surrounding its circumference and a second panel frame 3c for covering its rear surface, and the first and second panel frames 3b, 3c have their respective parts cut off in order to prevent any interference between the display unit 3 and the base 1 while the display unit 3 is turning. The display unit 3 turns in the $A_1$-$A_2$ direction and settles itself in either a vertically elongated position or a laterally elongated position (two-dot-and-dash line in FIG. 2).

In the data processor according to the present invention, also, the RAM 11b in the control unit has a display status storing region, and the ROM 11a stores an initialization routine. The above-mentioned display status storing region stores data on a vertically elongated or laterally elongated onscreen display presented when the data processor is turned off. In the initialization routine, read through the CPU 10 onto an onscreen display are data stored in the display status storing region which are presented when the data processor is turned Thereafter, a command is sent through the CPU to the display controller 16 corresponding to set a vertically elongated or laterally elongated onscreen layout to the display unit 3.

Figure 5:
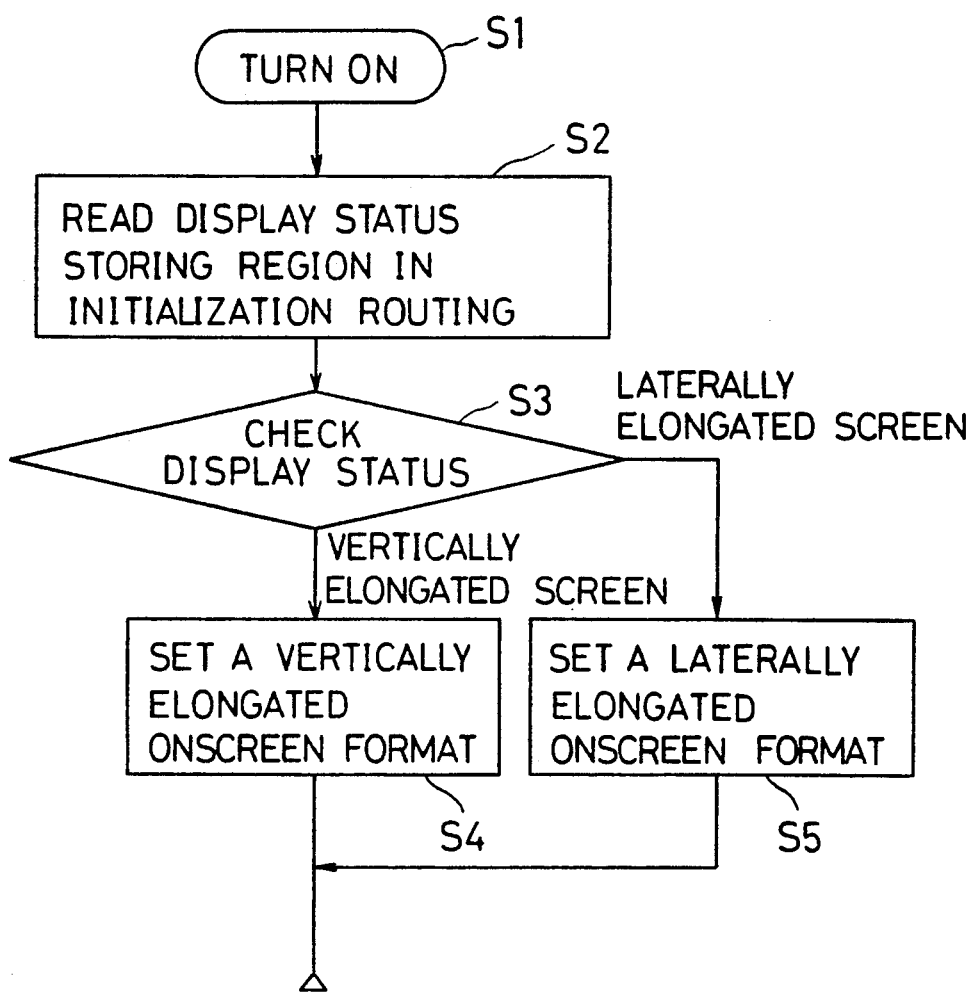
FIG. 5 is a flow chart showing a process of displaying a picture in the data processor.

A process of displaying a picture in the data processor as previously described will be explained in conjunction with a flow chart shown in FIG. 5.

First, turning on the data processor (S1), data on an onscreen display stored in the display status storing region in the RAM 11b is read through the CPU 10 in the initialization routine stored in the ROM 11a (S2).

Figure 6:
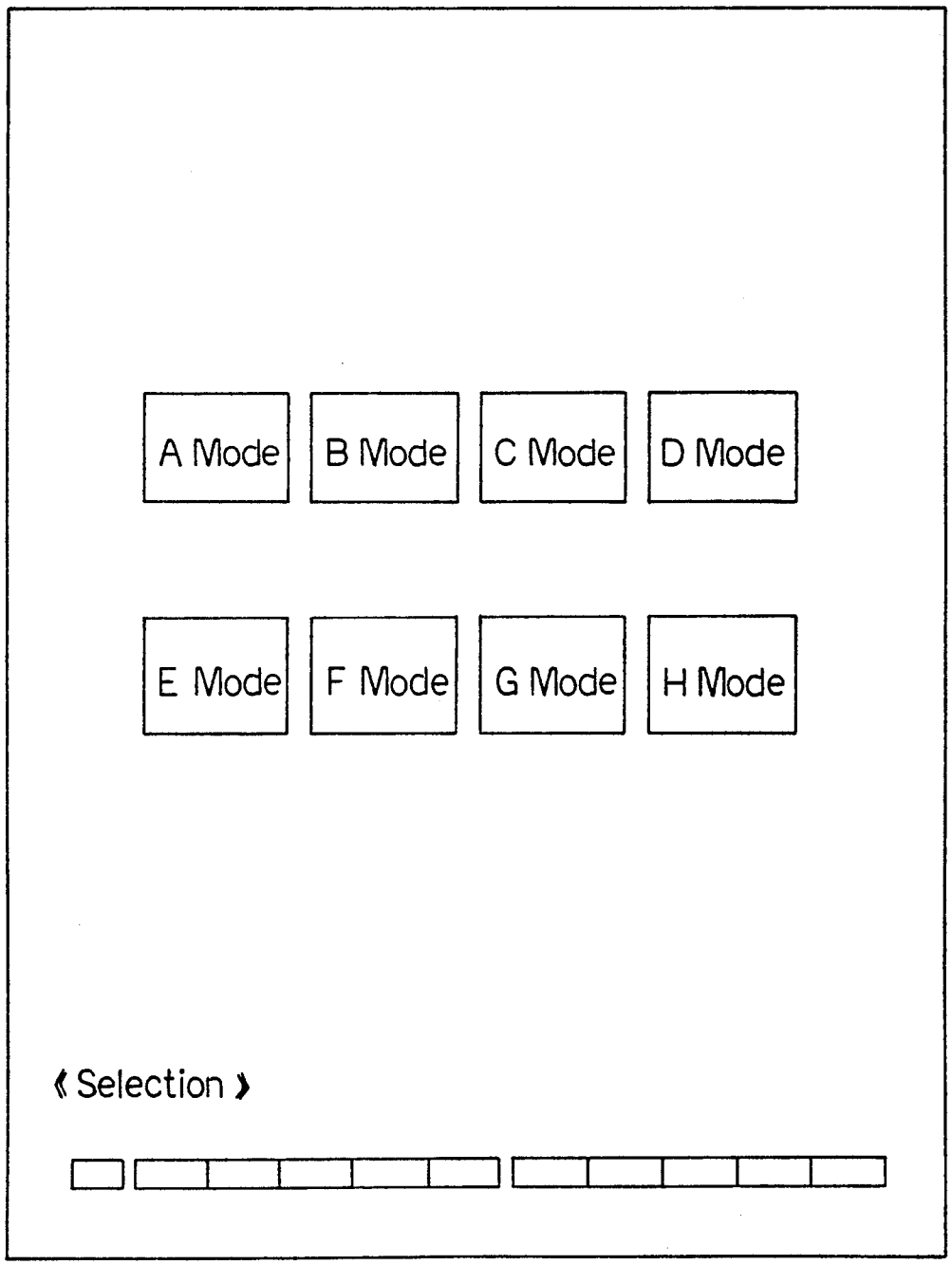
FIG. 6 is a diagram showing a vertically elongated selection screen presented by the display unit.

Then, in accordance with the data on the onscreen display, a display status is determined, a vertically elongated screen or a laterally elongated screen (S3). If it is recognized as the vertically elongated screen, a command is accordingly sent through the CPU 10 to the display controller 16 to set a vertically elongated onscreen format to the display unit 3 (S4), and a vertically elongated selection screen as shown in FIG. 6 is displayed on the liquid crystal display panel 3a. On the contrary, if recognized as the laterally elongated screen, a command is accordingly sent through the CPU 10 to the display controller 16 to set a laterally elongated onscreen format to the display unit 3 (S5), and a laterally elongated selection screen as shown in FIG. 7 is displayed on the liquid crystal display panel 3a.

Figure 7:
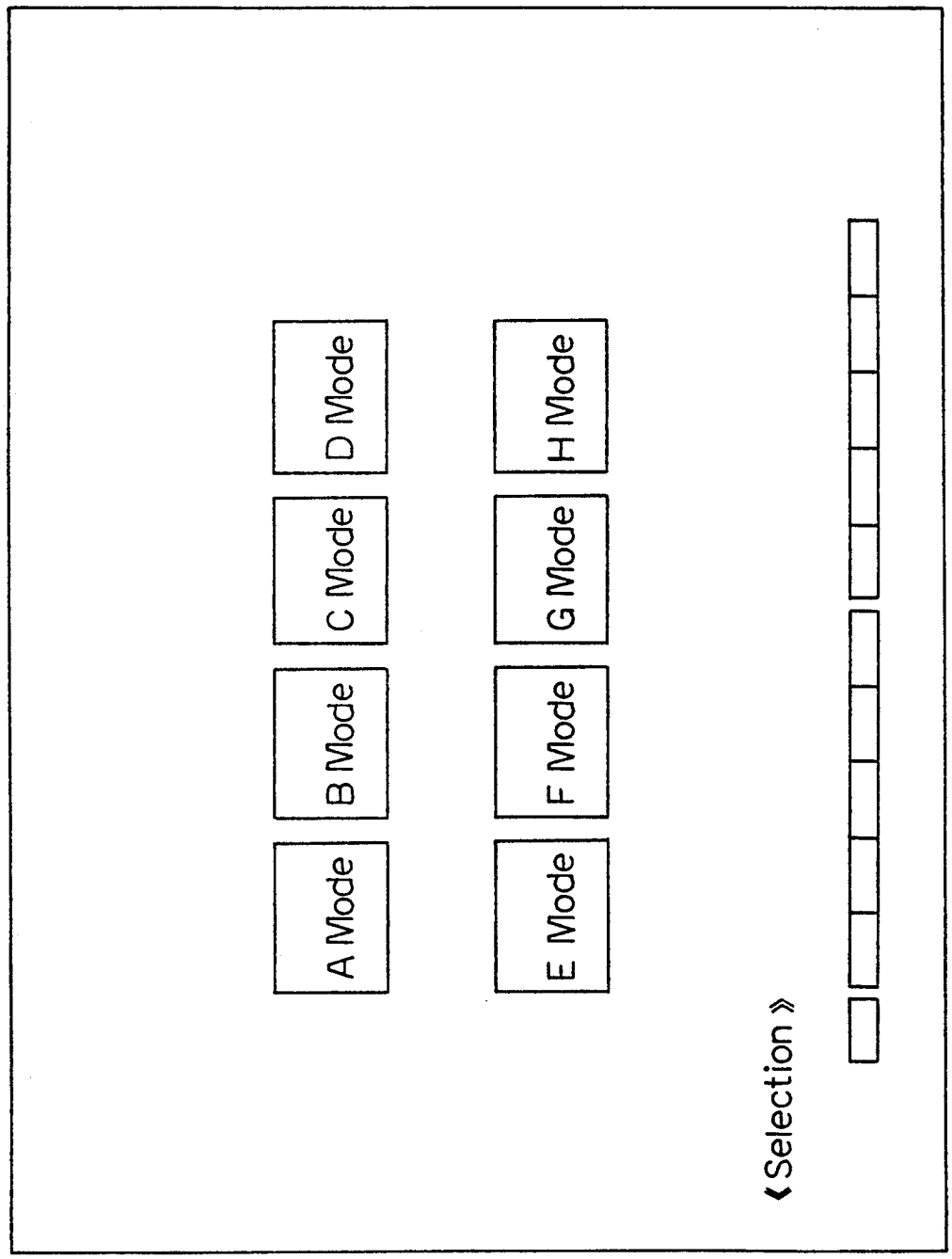
FIG. 7 is a diagram showing a laterally elongated selection screen presented by the display unit.
Figure 8:
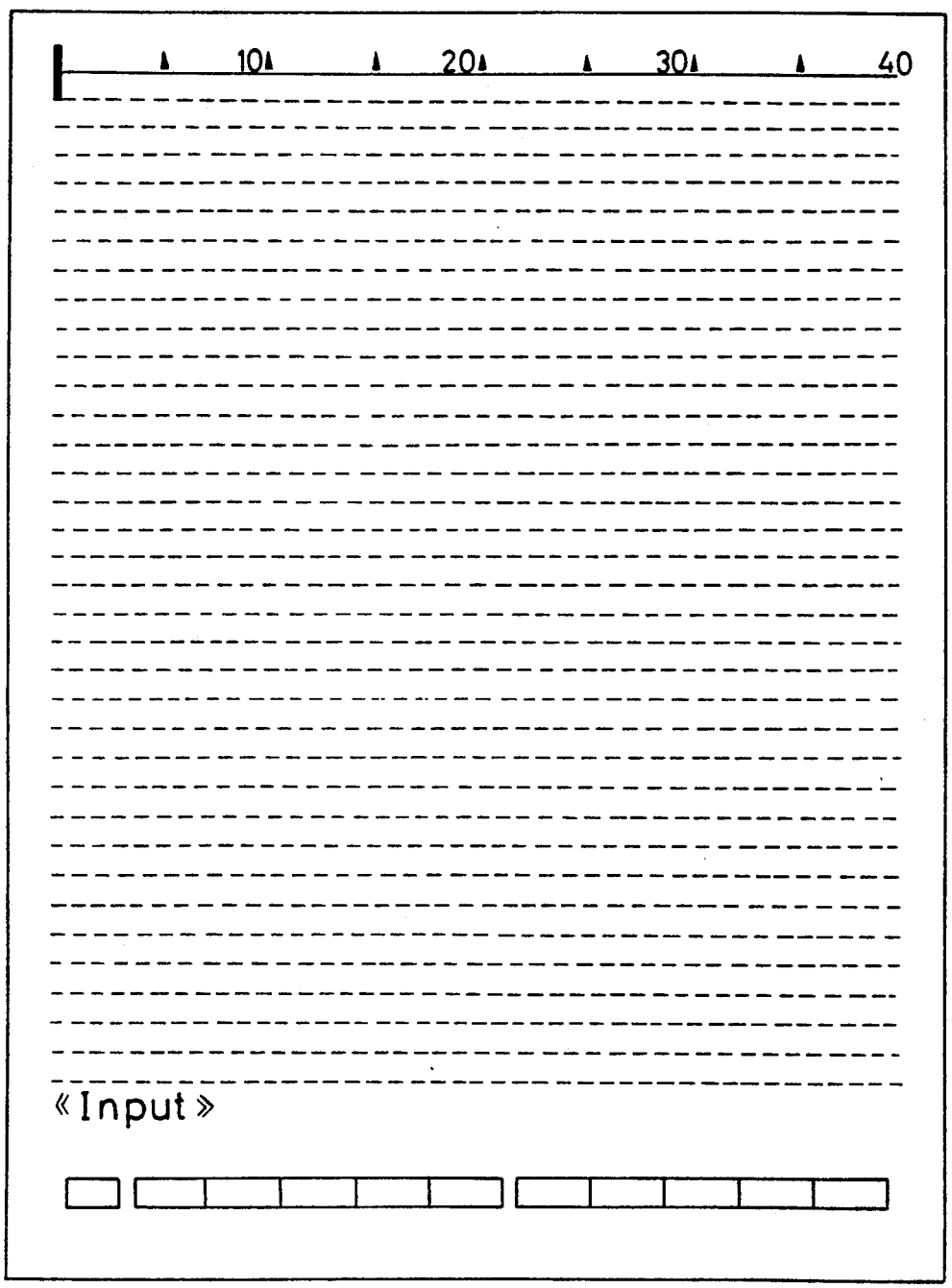
FIG. 8 is a diagram showing a vertically elongated document mode screen presented by the display unit.
Figure 9:
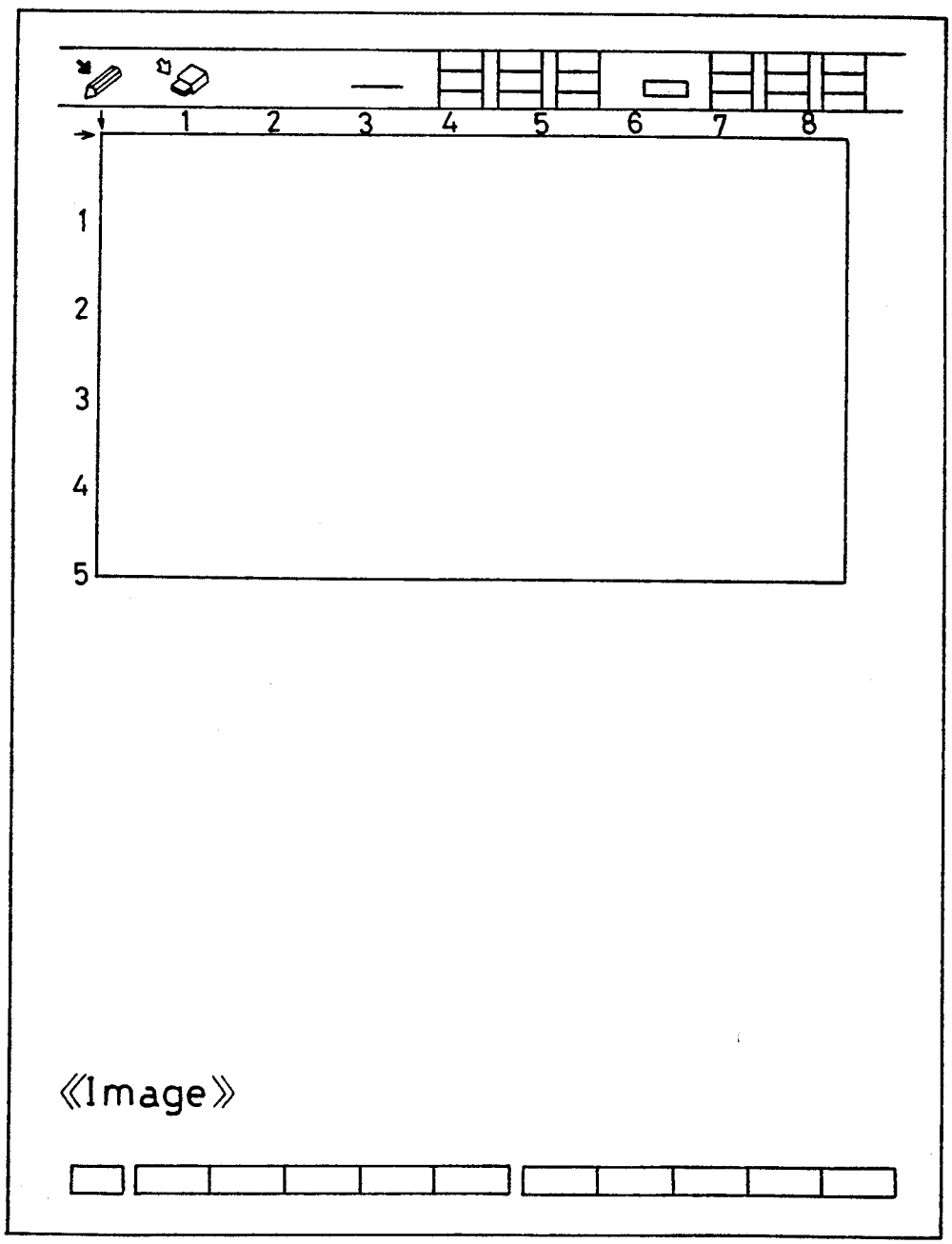
FIG. 9 is a diagram showing a vertically elongated image mode screen presented by the display unit.
Figure 10:
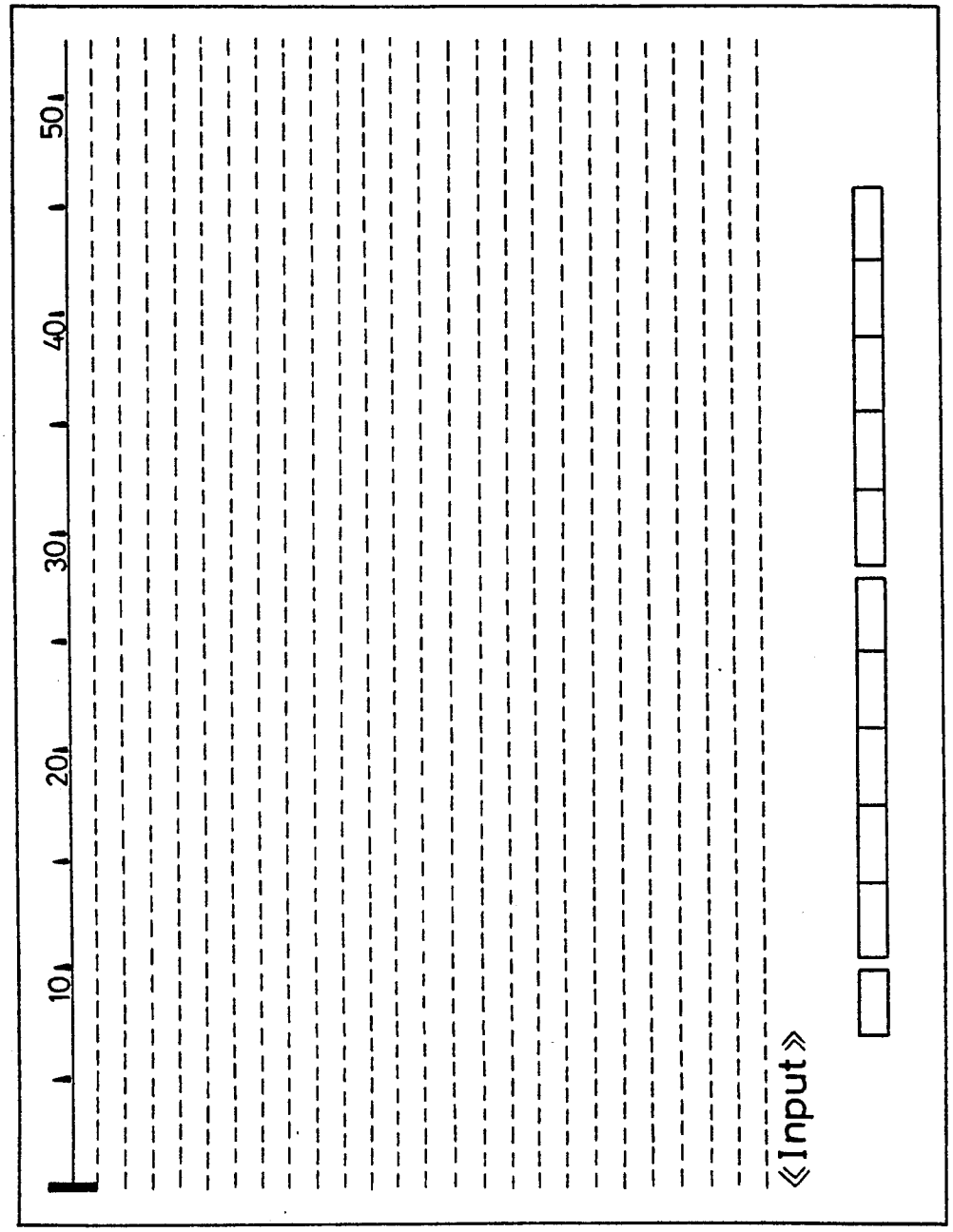
FIG. 10 is a laterally elongated document mode screen presented by the display unit.
Figure 11:
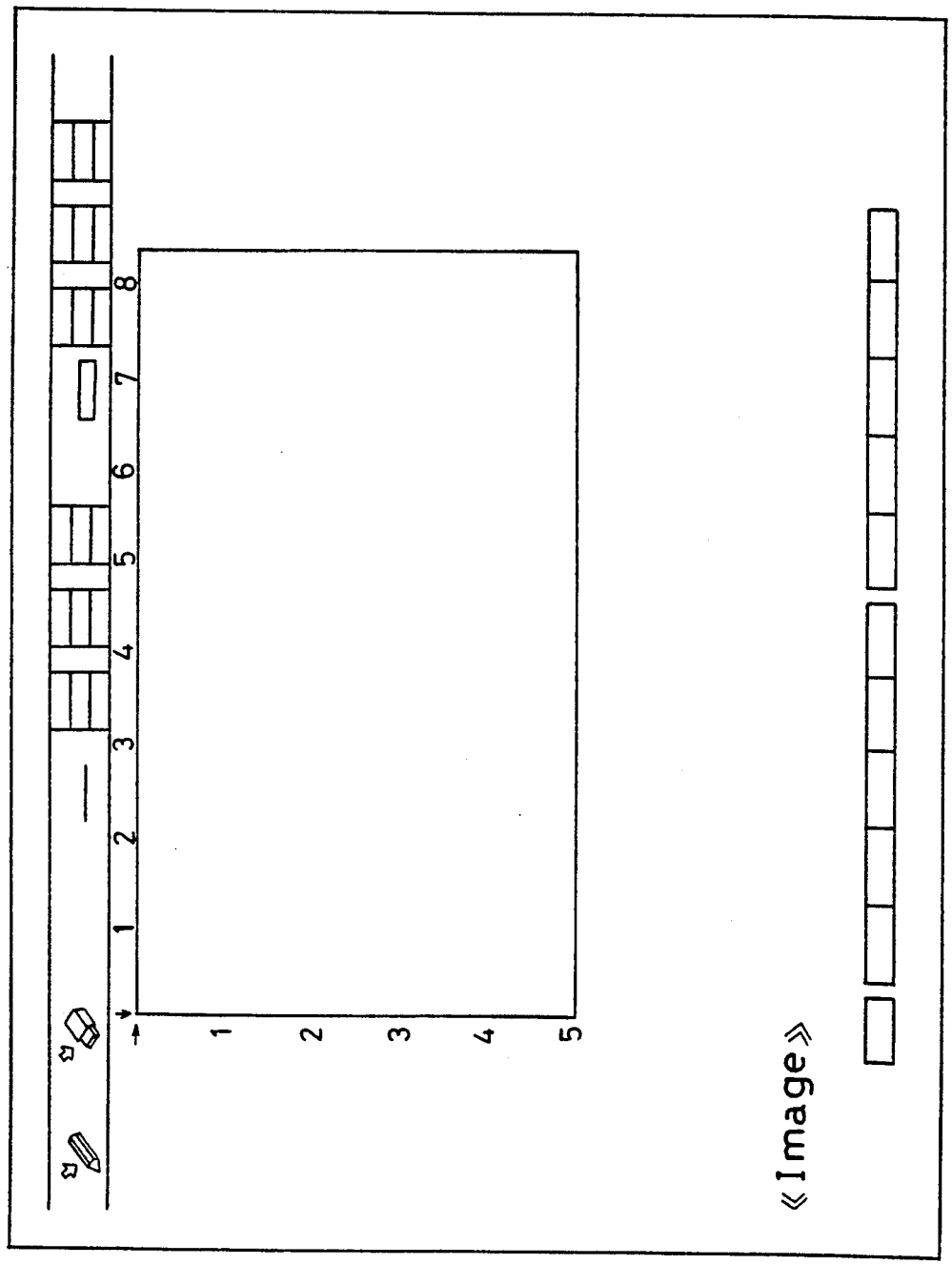
FIG. 11 is a diagram showing a laterally elongated image mode screen presented by the display unit.

After that, the user pushes selection keys on the key board 5 to display a document mode screen shown in FIG. 8, an image mode screen shown in FIG. 9, etc. in the case of the vertically elongated screen shown in FIG. 6 or to display a document mode screen shown in FIG. 10, an image mode screen shown in FIG. 11, etc. in the case of the laterally elongated screen shown in FIG. 7.

As has been described, in the data processor according to the present invention, the control unit which makes the display unit present picture data, such as characters, figures and the like, input from the key board 5 under its control includes the ROM 11a in which the initialization routine is stored and the RAM 11b in which the display status storing region. In this way, when the display unit 3 is fixed in either a vertically elongated direction or a laterally elongated direction in practical use, data on an onscreen display in a vertically elongated format or a laterally elongated format presented when the data processor is turned off is stored in the display status storing region of the RAM 11b, and in the next use of the data processor, after turning on it, the onscreen display previously used is automatically set by virtue of the initialization routine in the ROM 11a.

Switching of the onscreen display from a vertically elongated layout to a laterally elongated layout, and vice versa, is carried out by the operation on the key board 5 or by utilizing a mechanical switch in the display unit 3 as a trigger and applying a command from the CPU 10 to the display controller 16 to change the onscreen display, the display controller 16 controls the display unit 3 thereafter in accordance with a switching command, and the CPU 10 makes the display status storing region in the RAM 11b store either a current vertically or laterally elongated onscreen display on the display unit 3.

Figure 12:
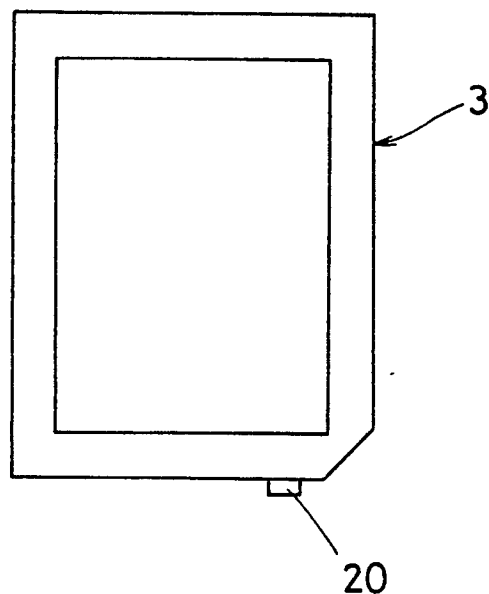
FIG. 12 is an elevational view showing a display unit with a sensor of an embodiment 2 according to the present invention.
Figure 13:
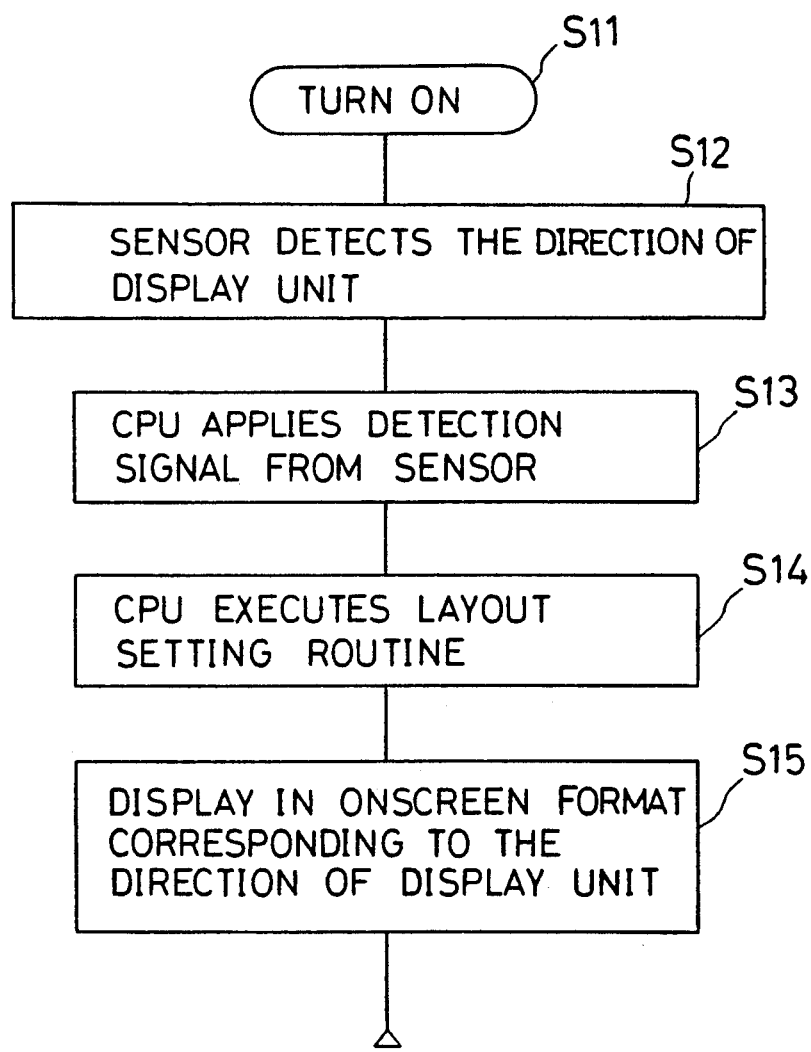
FIG. 13 is a flow chart showing a process of displaying a picture in the data processor of the embodiment 2 according to the present invention.

A preferred embodiment 2 according to the present invention will be described with reference to FIGS. 12 and 13.

The data processor according to the present invention is provided in a part of the bottom of the display unit 3 with a sensor 20 serving as a unit for detecting a directional status of the display unit 3, namely, a vertically elongated direction or a laterally elongated direction. The sensor 20 is provided with a micro-pushswitch to detect that the side affected by pressure is a bottom side. A detection signal from the sensor 20 is applied through an interface not shown to an input of the CPU 10 (see FIG. 4), and the CPU 10 executes an onscreen layout setting routine in the ROM 11a in accordance with the detection signal input thereto. Other components and systems of the data processor in this embodiment are similar to those of the preferred embodiment 1 (see FIGS. 1 to 4), and the description about them is omitted.

A process of displaying a picture in the data processor of this embodiment will be described in conjunction with a flow chart shown in FIG. 13.

First, turning on the data processor (S11), a directional status, namely, a vertically elongated direction or a laterally elongated direction, of the display unit 3 is detected by the sensor 20 (S12). Then, a detection signal about the directional status of the display unit 3 is applied from the sensor 20 through the interface to the input of the CPU 10 (S13). Then, the CPU 10 which has received the detection signal executes the onscreen layout setting routine in the ROM 11a in accordance with the detection signal (S14). In this way, the display unit 3 presents either a vertically elongated onscreen display or a laterally elongated onscreen display in accordance with the directional status, namely, a vertically elongated direction or a laterally elongated direction, of the display unit 3 (S15).

As has been described, in the data processor of this embodiment, the sensor 20 for detecting a directional status of the display unit 3, namely, a vertically or laterally elongated direction, is mounted in a part of the bottom of the display unit 3. Thus, in accordance with the detection signal from the sensor 20, an onscreen display presented on the liquid crystal display panel 3a of the display unit 3 is automatically set in a vertically elongated onscreen format or a laterally elongated onscreen format in accordance with the directional status of the display unit 3.

In this embodiment, while applying the detection signal from the sensor 20 to the input of the CPU 10, the onscreen layout of the display unit 3 is initializingly set when the processor is turned on, applying the detection signal from the sensor 20 to an interrupt input of the CPU 10 allows the onscreen layout to be set corresponding to the directional status of the display unit 3 even if the user switches the directional status of the display unit from a vertically elongated direction to a laterally elongated direction, and vice versa, during a use of the data processor.

As mentioned in the foregoing, the data processor according to the present invention includes a display unit which can turn between a vertically elongated position and a laterally elongated position, and a control unit which sets an onscreen display presented on the display unit to a vertically elongated onscreen layout or a laterally elongated onscreen layout under its control. The control unit stores an onscreen display presented when the processor is turned on to present the onscreen display stored on the display unit when the processor is turned on again.

In this way, when the display unit is fixed in a directional status, namely, in either a vertically elongated direction or a laterally elongated direction in use, an onscreen display can be automatically set to that of the previous use. Thus, the user may not perform an annoying operation of newly setting an onscreen layout, and consequently, work efficiency of the user is enhanced.

Also, the data processor according to the present invention includes a display unit which can turn between a vertically elongated position. A laterally elongated position, and a control unit sets an onscreen display presented on the display unit to a vertically elongated onscreen layout or a laterally elongated onscreen layout under its control. The directional status of the display unit, namely, either a vertically elongated direction or a laterally elongated direction, is detected by a directional status detecting unit. An onscreen display of a vertically elongated onscreen layout of a laterally elongated onscreen layout can be accordingly presented on the display unit under the control of the control unit.

In this way, an onscreen layout can be automatically set corresponding to the directional status of the display unit, either a vertically elongated direction or a laterally elongated direction, and consequently, a data processor effective in that an onscreen display of a vertically elongated layout or a laterally elongated layout can be automatically set can be provided.

A preferred embodiment 3 which is an application of the present invention to a data processor will be described with reference to FIGS. 14 to 17.

Figure 15:
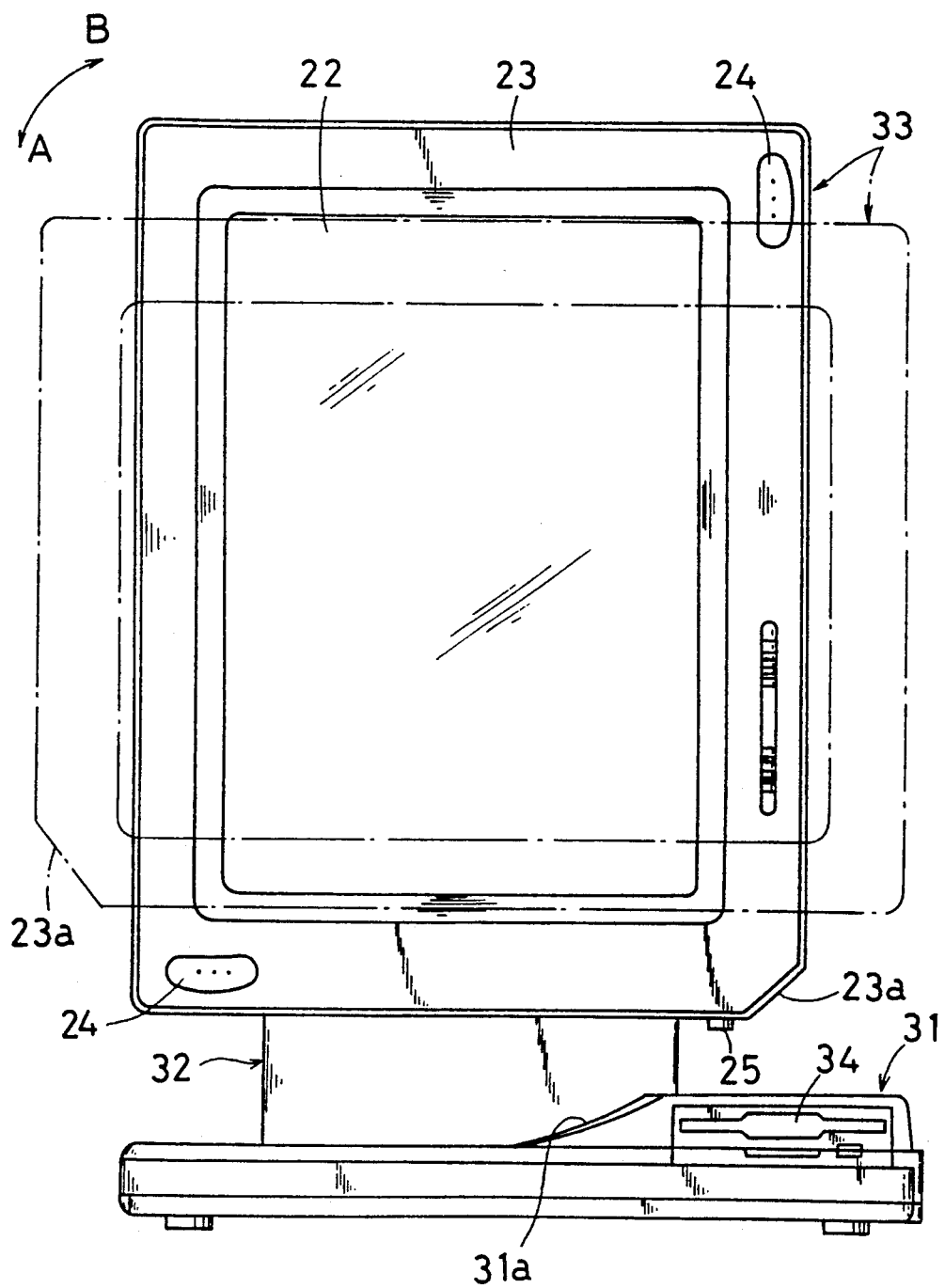
FIG. 15 is an elevational view showing an appearance of an embodiment 3 of the data processor.
Figure 16:
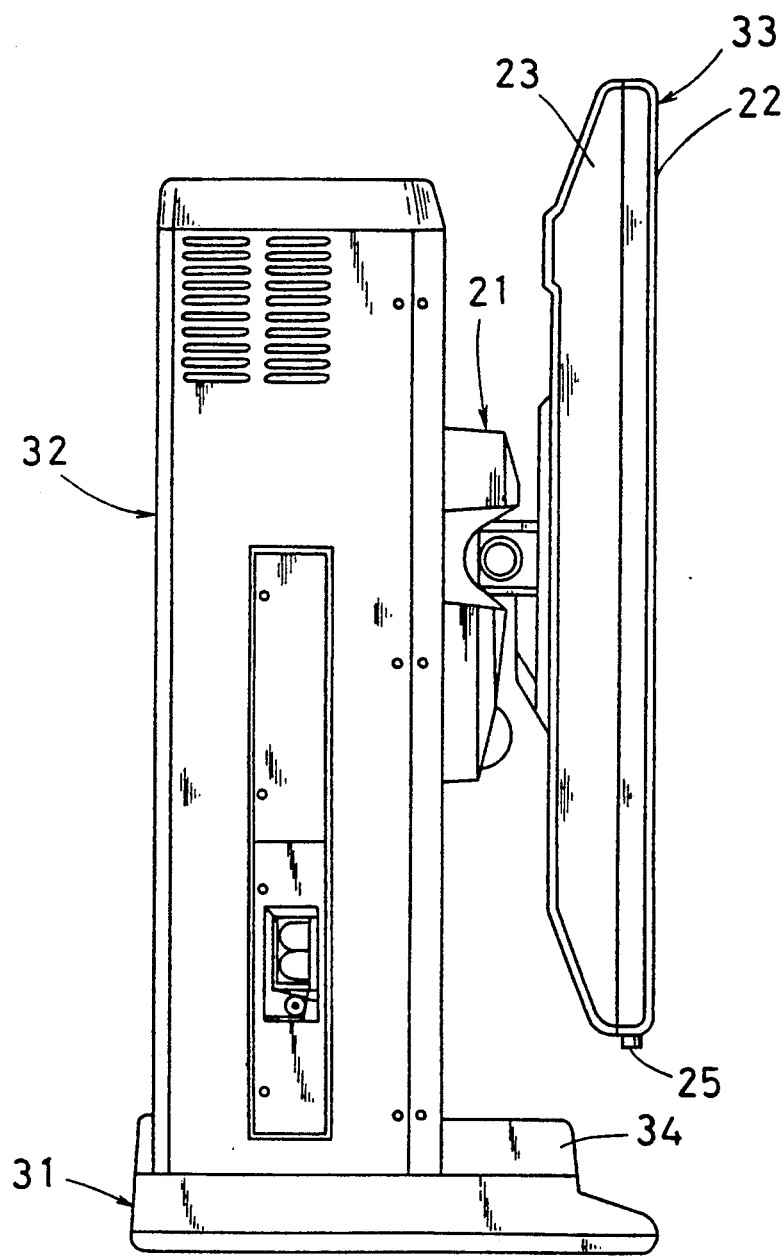
FIG. 16 is a left side view of FIG. 15.

As shown in FIGS. 15 and 16, a data processor of the embodiment 3 includes a base 31 which make the whole of the data processor rest on a desk or the like, a main unit 32 standing upright on the base 31, a display unit 33 which is held on a front side of the main unit 32 facing to the operator.

The base 31 has its front side projected from the main unit 32, and a floppy disc apparatus 34 for recording/reproducing document data and the like in and from a floppy disc 35 (see FIG. 17) in the right end of the from of the base 31. An inner side portion of the floppy disc apparatus 34 includes a curved and inclined surface 31a extending from the top of the floppy disc apparatus 34 to the top of the base 31.

The main unit 32 includes a control unit for controlling the operation of the data processor and the like within it, and also includes a pivotally fixing element 21 in its front. The pivotally fixing element 21 supports a display unit 33 so that it can turn in an A- or B- direction. The display unit 33 includes a liquid crystal display panel 22 serving a displaying surface and a panel frame 23 holding the liquid crystal display panel 22, and the display unit 33 has a corner 23a of the panel frame 23 partially cut away close to the floppy disc apparatus 34. Such a partially cut-away corner 23a together with the curved and inclined surface 31a is for preventing the display unit 33 from bumping against the base 31 while the display unit 33 is turning.

The liquid crystal panel 22 has a rectangular display region which is somewhat smaller than its outer dimensions, where a picture is displayed. The panel frame 23 is provided at corners at opposite ends of a diagonal line passing a center of the liquid crystal display panel 22 with a pair of power switches 24. One of the power switches 24 is positioned at the lower left when the display unit 33 is set in a vertically elongated direction as shown by a-dot-dash line in FIG. 15 while the other is positioned at the lower right when the display unit 33 is set in a laterally elongated direction as shown by a-dot-dash line in FIG. 15.

In the panel frame 23, a direction sensor 25 is attached close to the corner 23a in on the bottom of the display unit 33 when set in the vertically elongated direction. The direction sensor 25 serving as a unit for detecting a direction of the display unit 33, namely, a vertically elongated direction or a laterally elongated direction, is a micro-push-switch, which detects that a side affected by pressure is a bottom side to confirm a directional status of the display unit 33, namely, a vertically elongated direction or a laterally elongated direction. As such a detection unit, elements other than the micro switch may be used.

Components built in the main unit 32, such as a control unit and the like, will be described.

Figure 17:
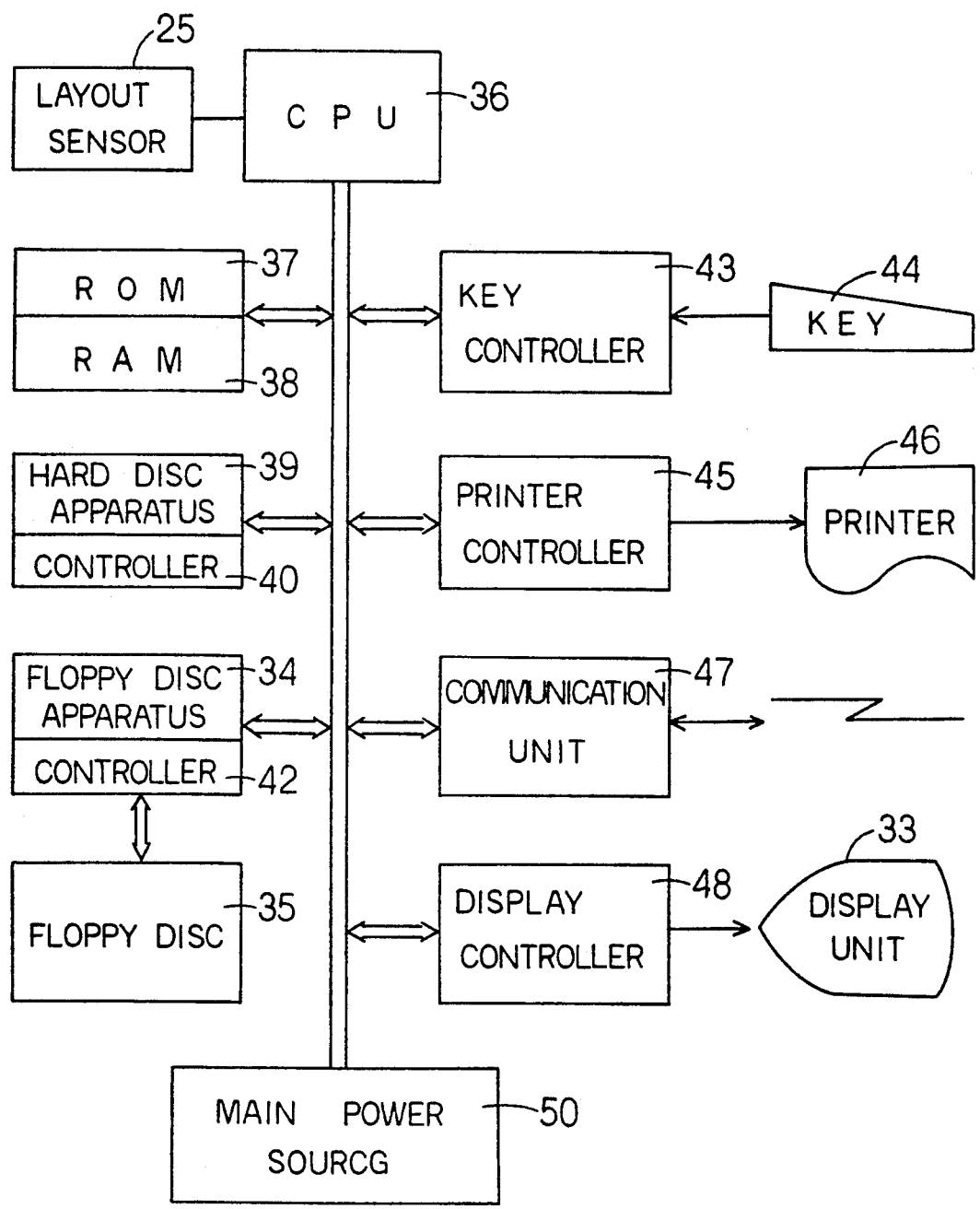
FIG. 17 is a block diagram showing a control unit of the data processor of FIGS. 15 and 16.

As shown in FIG. 17, the control unit consists of a CPU (Central processing Unit) 36, a ROM (Read Only Memory) 37, a RAM (Random Access Memory) 38, controllers 40, 42, a keyboard controller (key controller in the drawings) 43, a printer controller 45, a communication unit 47, and a display controller 48.

When a command to change a direction of the display region on the liquid crystal display panel 22 is input through a keyboard 44, the CPU 36 serving as a switching control unit compares the change command with a detection signal which is a result of the detection by the direction sensor 25 to give a command to the display controller 48 to change a direction of the display region in accordance with the above-mentioned change command only when deciding that the direction of the display region designated according to the change command and the direction of the display unit 33 identified according to the detection signal are the same. Thus, the CPU 36 has a function of making a decision in the case of an accord of two factors.

The change command is applied by an operation of switch keys (not shown) on the keyboard 44; for example, "1" corresponds to a vertically elongated direction while "0" corresponds to a laterally elongated direction. Thus, assuming that the detection signal corresponding to the vertically elongated direction of the display unit 33 is designated by "1" while the one corresponding to the laterally elongated direction of the display unit 33 is designated by "0", the CPU 36 switches the display region into a vertically elongated onscreen layout when both the change command and the detection signal are identified with "1" while it switches the display region into a laterally elongated onscreen layout when both of them are identified with "0".

The controllers 40 and 42 controls the hard disc apparatus 39 and the floppy disc apparatus 34 through a communication with the CPU 36. The keyboard controller 43 is connected to the keyboard (KEY in the drawings) to convert an input from the keyboard 44 into data which can be processed in the CPU 36. The keyboard 44 is provided with ten functions keys (not shown) each of which has three different functions, and switching of functions of each function key enables the user to utilize a variety of processing functions.

The ROM 37 is a read-only memory which stores programs and data for control, such as a program for executing the above-mentioned operation of the CPU 36 as well as a control program for each control unit and various data. On the other hand, the RAM 38 is a memory which can write/read upon occasion and which has a function to temporarily store input data, an operation result of the CPU 36, and the like.

The printer controller 45 is connected to the printer 46 and controls a printing operation of the printer 46 based upon a command of the CPU 36. The communication unit 47 is an apparatus for communicating with other data processors and the like, which includes a modem, for example. The display controller 48 converts display data into a video signal to transmit the display unit 33, and controls a display operation of the display unit 33 in accordance with a command of the CPU 36.

The main unit 32 houses a hard disc apparatus 39 and a main power source 50 other than the above-mentioned control unit. The hard disc apparatus 39 can record or reproduce document data and the like similar to the floppy disc apparatus 34, including a hard disc (not shown) as a recording medium. The main power source 50 supplies power to the hard disc apparatus 39 and the like.

Figure 14:
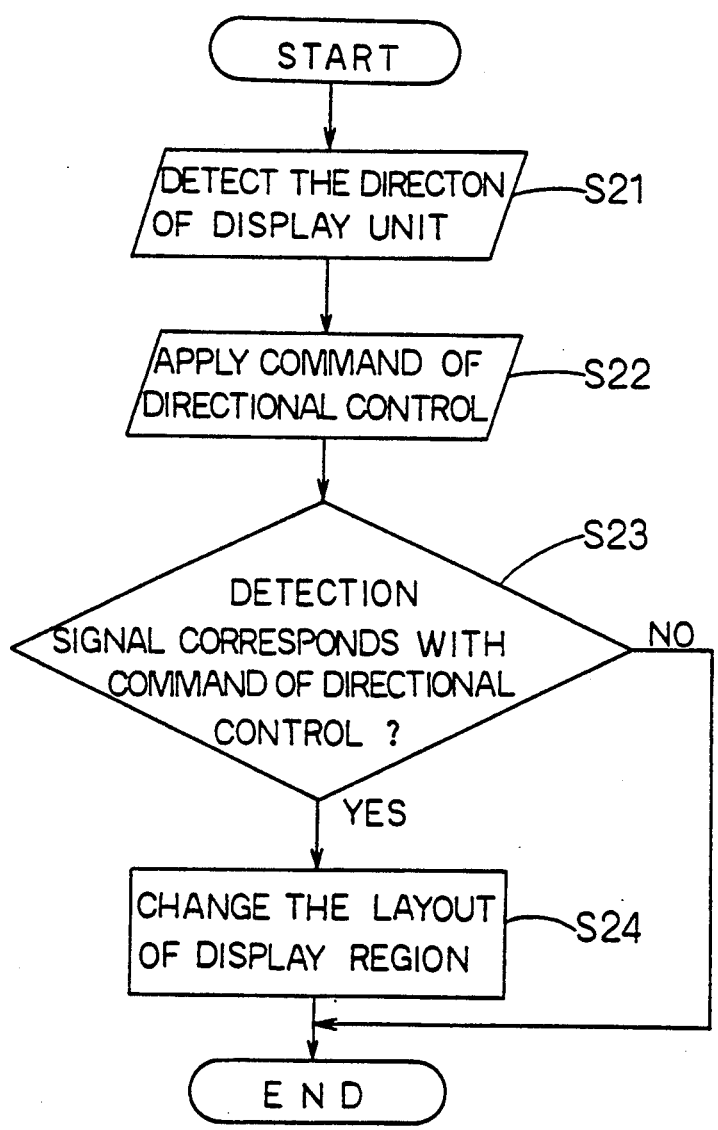
FIG. 14 is a flow chart showing a procedure of setting an onscreen layout corresponding to the direction of the display unit.

A procedure of setting an onscreen layout corresponding to the direction of the display unit 33 in the above-mentioned data processor will be described in conjunction with a flow chart in FIG. 14.

First, the direction sensor 25 detects a current direction of the display unit 33 (S21), and an operation of the keyboard 44 allows a change command of changing a direction of the display region to be input (S22). Then, a detection signal of the direction sensor 25 is compared with the change command, (S23). If it is determined that both are in the same direction the CPU 36 changes the direction of the display region (S24). On the other hand, if they are not the same the direction of the display region is not changed.

When the display unit 33 is set in a vertically elongated direction, for example, applying a change command to change the display region into a vertically elongated onscreen layout causes the display region to be changed into a vertically elongated onscreen layout as the command designates, but applying a change command to change the display region into a laterally elongated onscreen layout does not cause the display region to be changed into a laterally elongated onscreen layout.

As has been described, in the data processor according to the present invention, identification of the direction of the display unit 33 with the direction of the display region designated by a change command is determined by comparing a detection signal from the direction sensor 25 and a change command to change the direction of the display region, and hence, the direction of the display region can be always changed corresponding to the direction of the display unit 33. Thus, even if the user performs such an erroneous operation as to cause a maladjustment of the direction of the display unit 33, a command applied through such an operation is not accepted, and thus, an operation error can be prevented.

As previously mentioned, the data processor according to the present invention includes unit for detecting whether the display unit which can rotate between a vertically elongated position and a laterally elongated position is fixed in a vertically elongated direction or a laterally elongated direction, and a control unit for changing a display region displayed on a rectangular display surface of the display unit from a vertically elongated onscreen layout to a laterally elongated onscreen layout, and vice versa in response to a change command. The control unit includes identification unit which compares a detection result by the detecting unit with the change command for changing the direction of the display region only when the direction of the display unit is identified with the direction of the display region set in accordance with the change command.

In this way, the direction of the display region is changed only when the direction of the display unit is identified with the direction of the display region designated by a change command. Therefore, a change command to change the direction of the display region to a direction different from the direction of the display unit is ignored. Consequently, erroneous operation caused in changing the direction of the display unit is prevented, and an onscreen layout can always be set correctly. This enhances work efficiency.

What is claimed is:

1. A data processor with a rotatable display comprising:

a display including a rectangular display surface and rotatable to both a vertically elongated position and a laterally elongated position, control means for setting onscreen display data displayed by the display to either a vertically elongated format or a laterally elongated format, wherein the control means stores a current onscreen display format when the data processor is deactivated, and displays data in the stored current onscreen display format on the display when the data processor is later activated, and a base for supporting the display with the top surface of the base having a curved portion located to accommodate rotation of the display, wherein a corner of the display which passes adjacent to the curved base portion when the display is rotated is beveled.

2. A data processor of claim 1, in which the display includes:

detecting means for detecting a vertically or laterally elongated position of the display means, and wherein the control means controls the display means to display one of the vertically elongated onscreen and the laterally elongated onscreen formats in accordance with a detected result by the detecting means.

3. A data processor comprising:

a rotatable display having a rectangular display surface rotatable to both a vertically elongated position and a laterally elongated position, control means for commanding onscreen display data displayed by the display to one of a vertically elongated and a laterally elongated format, the display including detecting means for detecting a vertically or laterally elongated position of the display means, the control means controlling the display means to display one of a vertically elongated onscreen format and a laterally elongated onscreen format only when the commanded display format orientation coincides with the detected display orientation, and a base for supporting the display with the top surface of the base having a curved portion located to accommodate rotation of the display, wherein a corner of the display which passes adjacent to the curved base portion when the display is rotated is beveled.

4. A data processor comprising:

a rotatable display having a rectangular display surface rotatable to both a vertically elongated position and a laterally elongated position, a switch for generating a change command to change a display region which can display data on the display surface into one of a vertically elongated onscreen layout and a laterally elongated onscreen layout, control means for changing the display region into one of the vertically and the laterally elongated onscreen layout in accordance with the change command, the display including detecting means for detecting a vertically or laterally elongated position of the display, the control means including means for comparing a detected display direction generated by the detecting means with the change command and for changing a direction of the display region to the layout indicated by the change command only when a direction of the display means is the same as the direction of the display region designated by the change command, and a base for supporting the display with the top surface of the base having a curved portion located to accommodate rotation of the display, wherein a corner of the display which passes adjacent to the curved base portion when the display is rotated is beveled.

5. A data processor of claim 1, further comprising:

a switch for outputting a change command to change a display region which can display data on the display surface in a vertically elongated onscreen format or a laterally elongated onscreen format, the display means including detecting means for detecting a vertically or laterally elongated position of the display means, the control means changing the display region into the vertically or the laterally elongated onscreen format in accordance with the change command, and including identification means for comparing a detected result with the change command and for changing a direction of the display region to the format indicated by the change command only when a detected direction of the display means is the same as the direction of the display region designated in accordance with the change command.

* * * * *